US006763518B2

(12) United States Patent
Hart et al.

(10) Patent No.: US 6,763,518 B2
(45) Date of Patent: Jul. 13, 2004

(54) AUTOMATIC CLIENT/SERVER TRANSLATION AND EXECUTION OF NON-NATIVE APPLICATIONS

(75) Inventors: David L. Hart, Redmond, WA (US); Nanduri R. V. Ramakrishna, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 09/990,143

(22) Filed: Nov. 20, 2001

(65) Prior Publication Data

US 2002/0078260 A1 Jun. 20, 2002

Related U.S. Application Data

(62) Division of application No. 08/427,949, filed on Apr. 24, 1995, now Pat. No. 6,363,409.

(51) Int. Cl.[7] ................................................ G06F 9/54

(52) U.S. Cl. ............................................ 718/1; 718/107

(58) Field of Search ............................ 718/1, 100–108; 719/329

(56) References Cited

U.S. PATENT DOCUMENTS

| | | | |
|---|---|---|---|
| 5,305,461 A | | 4/1994 | Feigenbaum et al. |
| 5,487,158 A | | 1/1996 | Amelina |
| 5,490,256 A | | 2/1996 | Mooney et al. |
| 5,517,193 A | | 5/1996 | Allison et al. |
| 5,721,922 A | * | 2/1998 | Dingwall .................... 718/103 |
| 5,734,904 A | | 3/1998 | Kanamori et al. |
| 5,742,825 A | * | 4/1998 | Mathur et al. .............. 719/329 |

OTHER PUBLICATIONS

King, Adrian, "Inside Windows 95", Microsoft Press, pp. 63–80, 1994.*
Kennedy, "Make Windows Say WOW," *Windows Sources*, Feb. 1994, pp. 305–306.
Oney, "Mix 16–bit and 32–bit Code in Your Applications with the Win32s™ Universal Thunk," *Microsfot Systems Journal*, Nov. 1993, pp. 39–45, 48, 50, 52, 54–59 (advertising pages omitted).
Penrod, "How Today's Apps Will Run Tomorrow 16 Into 32?" *Windows Sources*, Jan. 1995, pp. 138–141.
Finnegan, "Gluing WIN16 to Windows NT Gets Easier with Generic Thunk," *Microsfot Journal*, vol. 9, #4, Jun. 1994, 42 pages; with sidebar "A Quantum Leap," 6 pages.
Finnegan, "Test Drive Win32® from 16–bit Code Using Windows NT WOW Layer and Generic Thunk," *Microsoft Systems Journal*, vol. 9, #6, Jun. 1994, pp. 13–15, 17–20, 23–26, 28–36 (advertising pages omitted).
Custer, "Windows and the Protected Subsystems," *Inside Windows NT*, Chapter 5, 1993 Microsoft Press, pp. 115–164.
Pietrek, Matt,; intercepting API functions in Win32, PC Magazine, v13, #19, p307(6), Nov. 8, 1994.
Richter, Jeffrey; "Load your 32–bit DLL into another process space using INJLIB", Microsoft Systems Journal, v9, #5, p13(22), 5/94.

(List continued on next page.)

Primary Examiner—St. John Courtenay, III
(74) Attorney, Agent, or Firm—Klarquist Sparkman, LLP

(57) ABSTRACT

A system for client/server translation and execution of non-native applications. Service requests within non-native (e.g. 16-bit) applications are translated to call 32-bit equivalents within a native (e.g. 32-bit) operating system. Both non-native and native server process share a library providing native program services. As a result of this translation, non-native applications are integrated into the native operating system, and can communicate and pass data to other non-native applications, and other native applications executing within the native client/server operating system.

16 Claims, 8 Drawing Sheets

OTHER PUBLICATIONS

Andrew Schulman, "At Last—write bona fide 32 bit programs that run on Windows 3.1 using Win32s", Microsoft Systems Journal, v8, n4, p15(16), 4/93.

Matt Pietrek, "Stepping up to 32 bits: Chicago's process, thread and memory management", Microsoft Systems Journal, V9, n8, p27(13), 8/94.

Vendito et al, "A step ahead of the next generation", windows Sources, v2, n6, p110(13), 6/94.

Randall Kennedy, "Make Windows say WOW", Window Sources v2, n 2, p305(2) 2/94.

Adrian King, "Windows, the next generation: an advance look at the architecture of Chicago", Microsoft System Journal V9, n1, p15(8), 1/94.

* cited by examiner

PRIOR ART

PRIOR ART

PRIOR ART

AUTOMATIC CLIENT/SERVER TRANSLATION AND EXECUTION OF NON-NATIVE APPLICATIONS

This application is a Division of U.S. patent application Ser. No. 08/427,949, filed Apr. 24, 1995, now U.S. Pat. No. 6,363,409.

FIELD OF INVENTION

The present invention relates to computer operating systems, and more specifically relates to a method and apparatus for client/server translation and execution of non-native applications.

BACKGROUND AND SUMMARY OF THE INVENTION

It is important, given the investment most users have in their applications software, that an application be usable with several different operating systems. However, this is difficult to achieve in practice due to the myriad of differences between the different operating systems (e.g. different internal design architectures, different process structures, different memory management, different exception and error handling, different resource protection mechanisms, etc.).

To help address this problem, operating system vendors provide support in a number of ways for different operating system environments. For example, IBM OS/2 version 2.0 (hereinafter simply "OS/2") runs applications written for Windows 3.1 (a "non-native application") by providing an environment for the application that mimics the Windows 3.1 environment.

In more detail, when OS/2 receives a request to run a Windows 3.1 application, it creates a process called a virtual machine (VM). The VM contains the Windows 3.1 application program and all the Windows 3.1 operating system components needed to support execution of Windows 3.1 applications. This process is repeated for each non-native application run under OS/2 (i.e. a separate VM containing a complete copy of all the operating system components needed to support the non-native application is spawned for each).

There are several problems associated with this replicate-a-non-native-OS-in-a-VM approach. One is its ineffective and wasteful use of resources. Windows 3.1 is a relatively old (in computer terms) 16-bit operating system. OS/2 is a newer 32-bit operating system that includes all of the functionality of older 16-bit operating systems, and provides additional capabilities as well. The provision of components from the older 16-bit Windows 3.1 operating system inside each VM spawned by the more modern 32-bit OS/2 operating system for a Windows 3.1 application is an unartful way to provide compatibility; the resources of the 32-bit operating system are essentially wasted.

A further drawback of this approach is that non-native applications running in separate VMs can't readily "see" each other (e.g. communicate or exchange data). For example, dynamic data exchange (DDE) and object linking and embedding (OLE) between applications executing in separate VMs is difficult, if possible at all. (Such data exchange between applications is important in order to achieve seamless integration between applications. An illustrative case is a user who wants to link a chart from a spreadsheet program into a word processing document, where each time the chart is updated in the spreadsheet program, the chart in the word processing document is likewise updated.) Under OS/2, such seamless integration cannot be achieved.

Yet another problem is that, when a non-native application executes, the non-native video driver in its VM takes control of the computer's video display hardware (and sometimes other hardware) from the OS/2 operating system. This results in "blacking out" of the existing OS/2 native user interface, and, a moment later, the presentation of a different user interface associated with the non-native application. Some users find the total loss of the familiar OS/2 interface to be a considerable inconvenience.

Alternatively, the OS/2 video device driver can be modified to present the OS/2 user interface over most of the screen, but surrender control of a rectangular window (a "black hole") to a non-native video device driver associated with a VM. These two concurrently executing video device drivers must cooperate so that neither interferes with regions of the display allocated to the other driver. This cooperation between 16-bit and 32-bit video device drivers is difficult at best, and becomes extremely complicated when several VMs are overlapped on the display screen. The modifications to the OS/2 device drivers sometimes lead to unexpected behavior since they interfere with the device driver's original design.

In accordance with a preferred embodiment of the present invention, problems associated with this replicate-a-non-native-OS-in-a-VM approach are overcome. An operating system with a client/server architecture including a set of specially modified server processes called modified virtual machines (MVMs) is provided. In client/server operating systems, such as Windows-NT by Microsoft, "clients" are processes that request services, e.g. file service, memory management, etc. (Clients are often, but are not necessarily, applications programs.) "Servers" are processes that provide services. Communications between client and server processes are handled by an operating system "kernel."

When an individual server process MVM is created, only the essential "kernel" components of the non-native operating system are copied into the MVM (i.e. essential, non-replaceable device drivers, interrupts, etc.). Other operating system support required by the non-native (16-bit) application is provided from the native (32-bit) operating system through a translation procedure ("thunking"). For example, if the non-native (16-bit) application requests services such as user interface (UI), graphics device interface (GDI), DDE, OLE, etc., the service request is automatically thunked into the corresponding native (32-bit) service request and passed to the native (32-bit Windows-NT) operating system. The native operating system services the request and passes any return data through the thunking process and back to the originating non-native application. By this arrangement, all MVMs make shared use of a common set of native operating system functions, gaining the enhanced functionality of the native (32-bit) services, and facilitating communication and data sharing between applications.

This arrangement also allows the native operating system to maintain exclusive control over the video display and other hardware. The prior art "blacking out" and "black hole" phenomena are eliminated.

The foregoing and other features and advantages of the preferred embodiment of the present invention will be more readily apparent from the following detailed description, which proceeds with reference to the accompanying drawings.

DETAILED DESCRIPTION OF A PREFERRED EMBODIMENT

Figure 1:
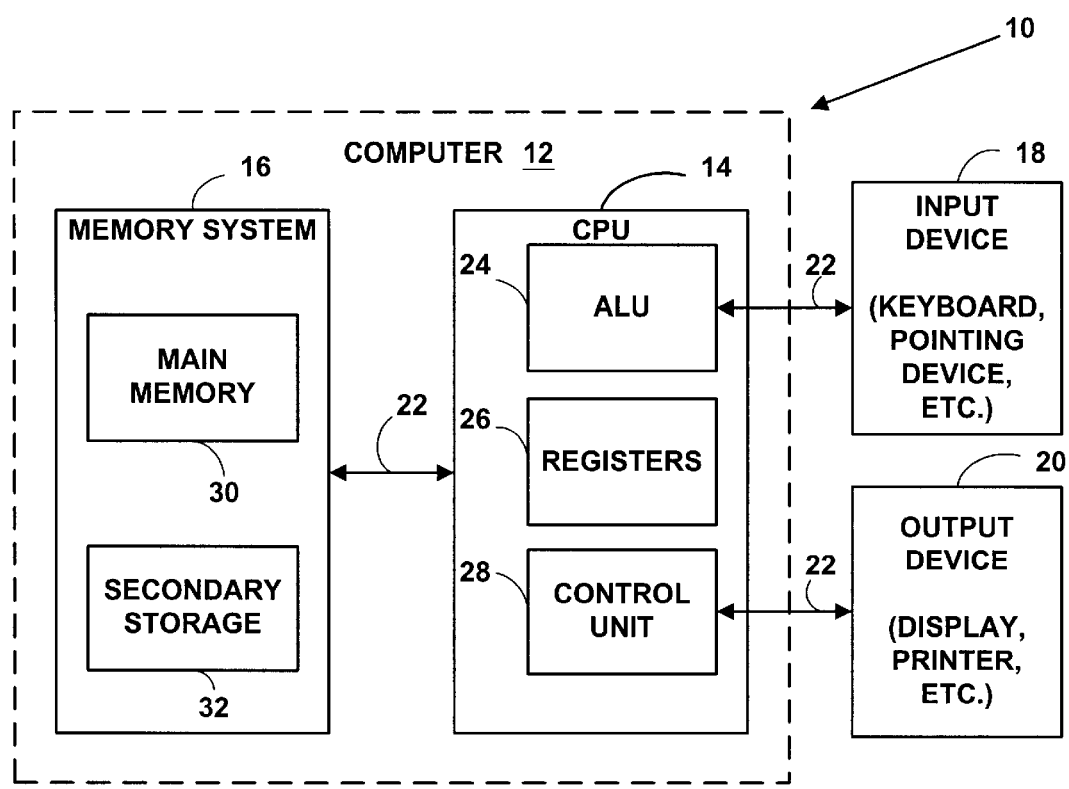
FIG. 1 is a block diagram of a computer system used in the preferred embodiment of the invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, sound device (e.g. a microphone, etc.), or any other device providing input to the computer system 10. The output device 20 can comprise a display, a printer, a sound device (e.g. a speaker, etc.), or other device providing output from the computer system 10. The input/output devices 18, 20 can also include network connections, modems, or other devices used for communications with other computer systems or devices.

As is familiar to those skilled in the art, the computer system 10 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 16.

In accordance with the practices of persons skilled in the art of computer programming, the present invention is described below with reference to symbolic representations of operations that are performed by computer system 10, unless indicated otherwise. Such operations are sometimes referred to as being computer-executed. It will be appreciated that the operations which are symbolically represented include the manipulation by CPU 14 of electrical signals representing data bits and the maintenance of data bits at memory locations in memory system 16, as well as other processing of signals. The memory locations where data bits are maintained are physical locations that have particular electrical, magnetic, optical, or organic properties corresponding to the data bits.

The present invention is illustrated in the context of the Microsoft Windows-NT operating system. For a complete discussion of the Windows NT OS see *Inside Windows NT*, by Helen Custer, Microsoft Press, 1993. However, these concepts can be used with other operating systems to provide translation and execution of non-native applications.

In prior art versions of Windows NT, all non-native application programs (e.g. Windows 3.1) were created and executed in a single VM. In IBM's OS/2, version 2.0 and later, in contrast, non-native applications can be run in their own private VMs. OS/2 runs a modified copy of Windows 3.1 in each VM and interfaces to the OS/2 operating system using, e.g., modified video device drivers. However, the IBM OS/2 implementation of separate VMs has numerous drawbacks, as discussed in the Background/Summary sections above.

In the following discussion, VMs are called virtual DOS machines, or VDMs. A VDM is a Windows-NT (Win32) application that establishes a complete virtual computer running MS-DOS. For example, a VDM allows MS-DOS applications to issue machine instructions, to call the Basic Input Output System (BIOS), to access certain devices, receive interrupts, etc. Within the VDM, MS-DOS based applications (e.g. Windows 3.x, etc.) can be executed.

Figure 2:
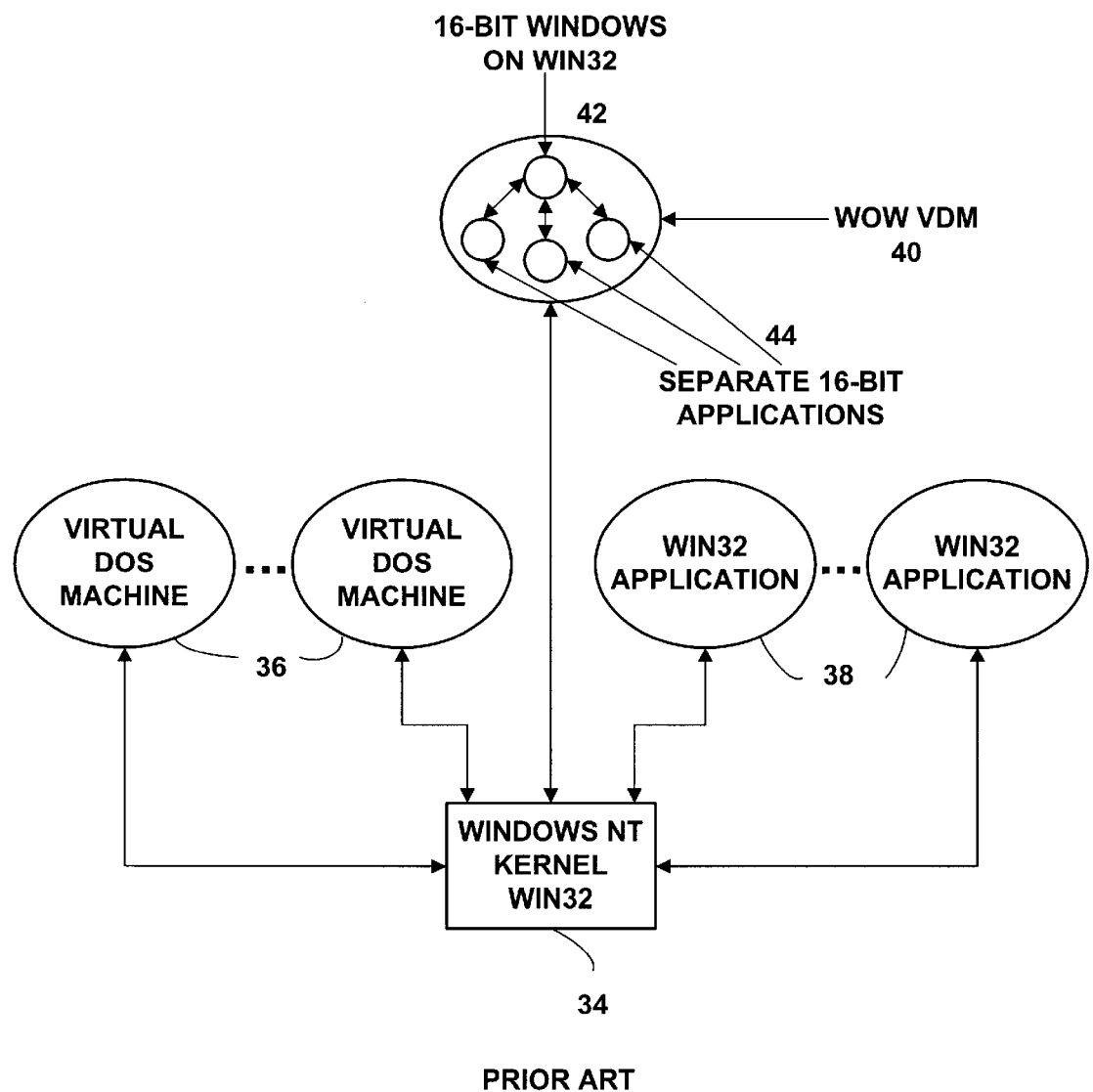
FIG. 2 is a block diagram of the prior art software architecture used in the client/server operating system Windows-NT.

Referring now to FIG. 2, an architectural view of the software components of the computer system 10 is shown. Included is a 32-bit Windows-NT kernel 34 a plurality of VDMs 36, 38, 40.

In operation, when the Win32 kernel 34 receives a request to execute a non-native application, it does a check of the non-native application. If the executable image runs on MS-DOS, the kernel 34 spawns a VDM 36. Each VDM running under Windows NT is a separate Win32 application controlled by the kernel 34. If the non-native application is Windows 3.x, the kernel loads the Windows-on-Windows (WOW) environment 42 in the VDM 40. If the WOW VDM executes any applications, the applications 44 are executed within the WOW VDM 40. The kernel 34 also controls native Win32 applications 38 (e.g. Win32 application program interfaces (API's)).

The Windows-on-Window environment is a known architectural arrangement that allows non-native Windows 3.x and associated Windows 3.x applications to be run on Windows-NT. The WOW environment runs within the context of a native Win32 process. As far as Windows-NT is concerned, the WOW VDM is just another process with its own process space and thread, like any other Win32 application. For further reference, the reader is referred to, e.g., Kennedy, R., "Make Windows Say WOW," Windows Sources, v2, n2, p305(2), February, 1994; and Finnegan, J., "Test Drive Win32 From 16-bit Code Using the Windows NT WOW Layer and Generic Thunk," Microsoft Systems Journal, v9, n6, p13(22), June, 1994.

Figure 3:
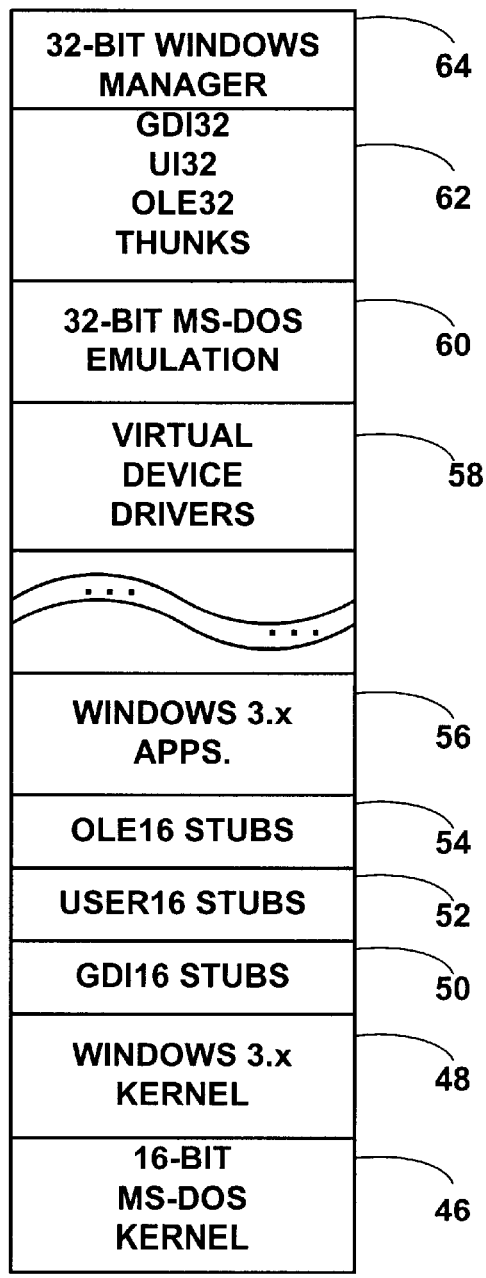
FIG. 3 is a block diagram of the memory layout of the Windows-on-Windows Virtual DOS Machine.

The virtual address space for the WOW VDM is shown in FIG. 3. At the bottom of the virtual address space is the 16-bit MS-DOS kernel 46. The 16-bit MS-DOS kernel is essentially MS-DOS minus the file system support. Sixteen-bit MS-DOS emulation is needed since Windows 3.x is a 16-bit application, and may execute other 16-bit based applications. Above the 16-bit MS-DOS emulation is the Windows 3.x (Win16) kernel code 48 with multi-tasking support removed. This kernel code handles Windows 3.x memory management functions, loads executable images, dynamic-link libraries (DLLs), etc. for 16-bit Windows applications.

Figure 4A:
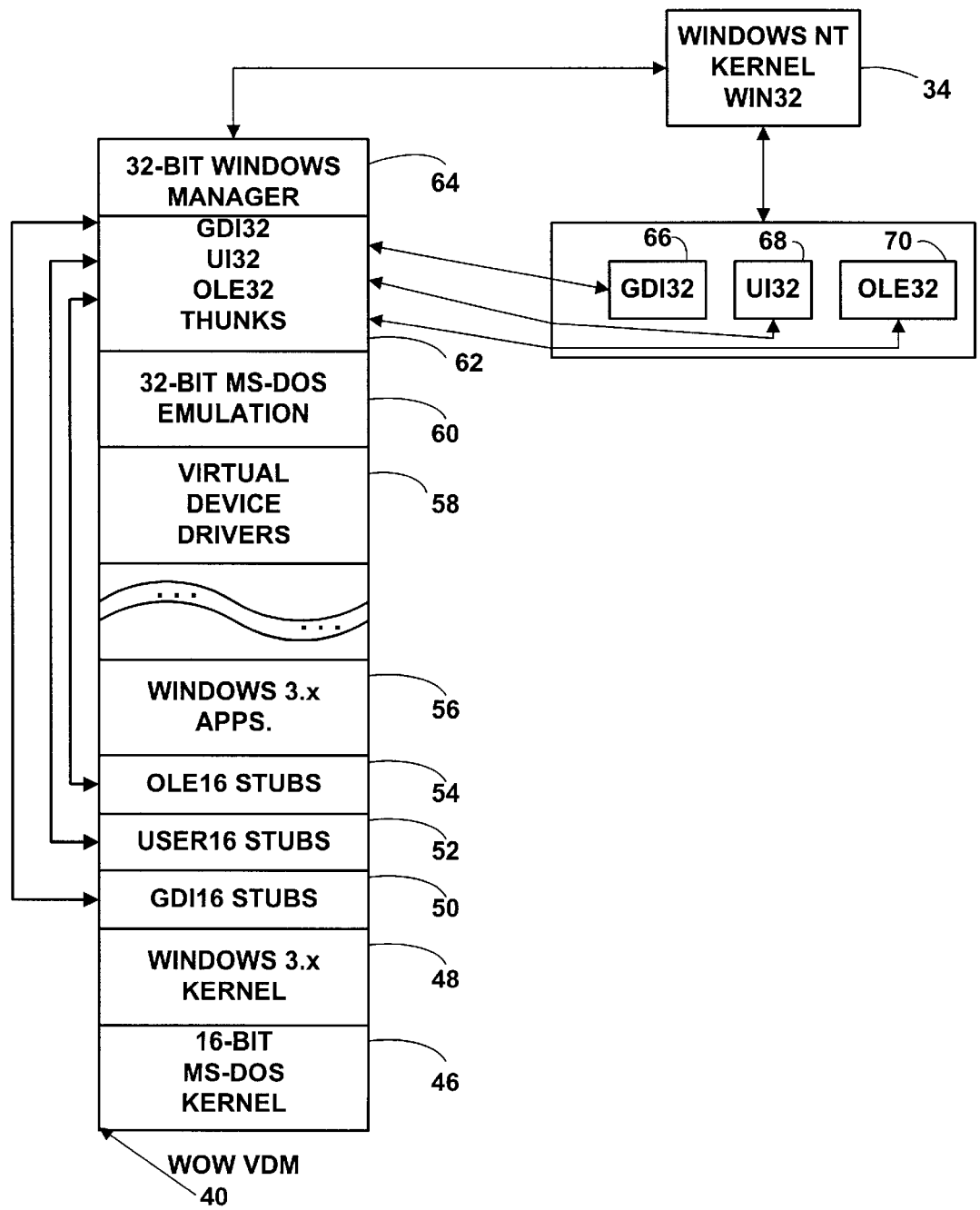
FIG. 4A is a block diagram of a WOW VDM memory layout under Windows-NT.

Above the Win16 kernel is the 16-bit graphics display interface (GDI) 50, user interface (UI) 52 and object linking and embedding (OLE) 54 stub routines. To integrate the WOW VDM into the Win32 OS, these 16-bit routines are thunked to create 16-bit stubs (i.e. each separate VDM has its own 16-bit GDI, UI, and OLE functions stubs.) Within the stubs, calls are made to the appropriate and equivalent 32-bit GDI, UI, and OLE functions 62. As a result of thunking, each VDM shares with all the others one common set of Win32 GDI, UI and OLE functions. This is shown in FIG. 4A. Thunking also makes each VDM smaller in size so it takes up less space in memory. The thunking process is detailed below.

Figure 4B:
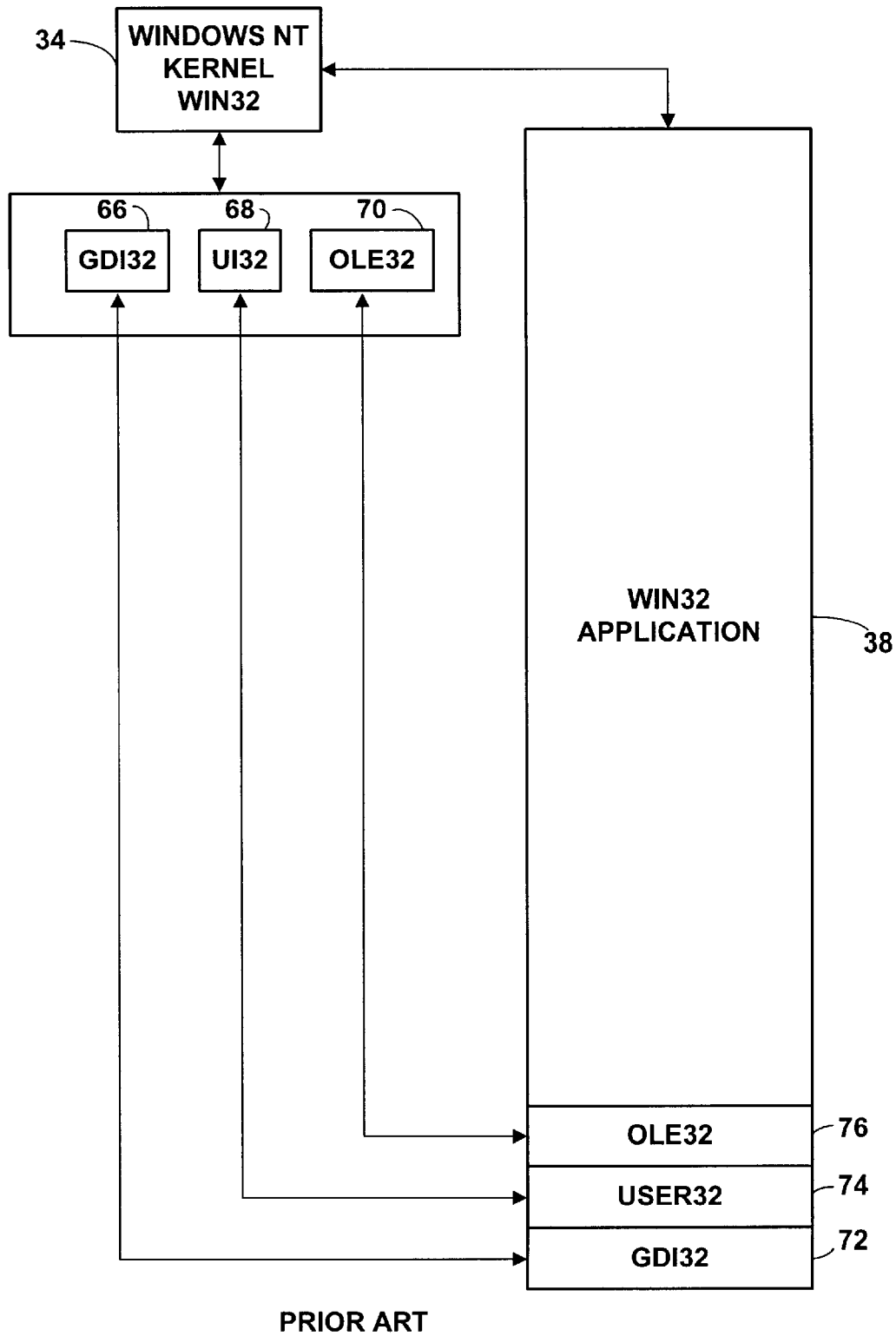
FIG. 4B is a block diagram of a Win32 process memory layout under Windows-NT.

Since only one set of shared Win32 GDI, UI, and OLE functions are used by the VDMs (and other Win32 applications), any individual VDM, or any application which may be running within the VDM, or any Win32 application, can communicate and share data (e.g. via DDE and OLE) with each other. FIG. 4B shows a Win32 application 38 which has a 32-bit GDI 72, UI 74, and OLE 76 and uses the same 32-bit GDI 66, UI 68 and OLE 70 as the WOW VDM 40 shown in FIG. 4A.

Returning to FIG. 3, above the 16-bit stubs reside 16-bit Windows applications 56. Any number Win16 applications can be run in this memory area. Above the 16-bit Windows applications are the virtual MS-DOS device drivers 58, 32-bit MS-DOS emulation code 60, GDI, UI, OLE thunks 62, and a 32-bit window manager 64.

The MS-DOS virtual device drivers 58 act as a layer between MS-DOS applications and the hardware attached to Win32. Virtual device drivers for standard computer services, including the mouse, keyboard, printer, communications ports, etc. are typically included. The 32-bit MS-DOS emulation code 60 handles MS-DOS input/output (I/O) operations by trapping them and calling either Win32 functions or the instruction execution unit for execution of the request.

The 32-bit window manager UI, GDI and OLE thunks 62 each takes the 16-bit segmented addresses and parameters supplied by the application and transforms them to conform with the 32-bit flat addressing model. The equivalent Win32 function is then executed. When the Win32 function returns its results, the Win32 stub un-thunks the 32-bit addresses back to the 16-bit segmented addresses and returns the result(s) to the Win16 application.

In a WOW VDM, 16-bit multi-tasking code is translated by Win32 code by calls to the Win32 application program interface (API), and by the NT kernel's multi-tasking code. Once the WOW environment 42 is running, the Win32 kernel 34 sends it a message each time the user starts a VDM application. WOW responds by loading the application into memory and calling the Win32 function CreateThread( ) in the Win32 API to create a thread to run the application. All other threads (i.e. all other Win16 application threads) are scheduled non-preemptively to make the WOW environment compatible with Win16. This does not mean that WOW threads are allowed to run as long as they want. The NT kernel still interrupts a WOW thread's execution to let non-WOW threads in the system run (i.e. other Win32 process threads). However, when it switches back to WOW, the kernel selects the interrupted WOW thread to continue. This behavior parallels the non-preemptive multi-tasking that Windows 3.x applications expect, without affecting Win32 or other applications running on Windows NT. This effectively further integrates VDMs into the native OS.

When a application within a WOW VDM 44 needs to make a function call for most 16-bit services, thunking occurs since the WOW VDM has been integrated into the native OS. For example, consider a generic WOW VDM function call WOW16Call( ). In Win32, a table of functions providing various functionalities is stored within the native dynamic link library (DLL) Win32.DLL (e.g. the GetDriveType( ) function is located at table location 0×88 in the Win32.DLL). Under Windows 3.x, the location of the function in the DLL is looked up in the function table (in this case the in the Win32.DLL since the Windows 3.x application is a Win32 process) and executed. A flowchart for thunking a WOW16Call( ) is shown in FIGS. 5A and 5B.

Figure 5A:
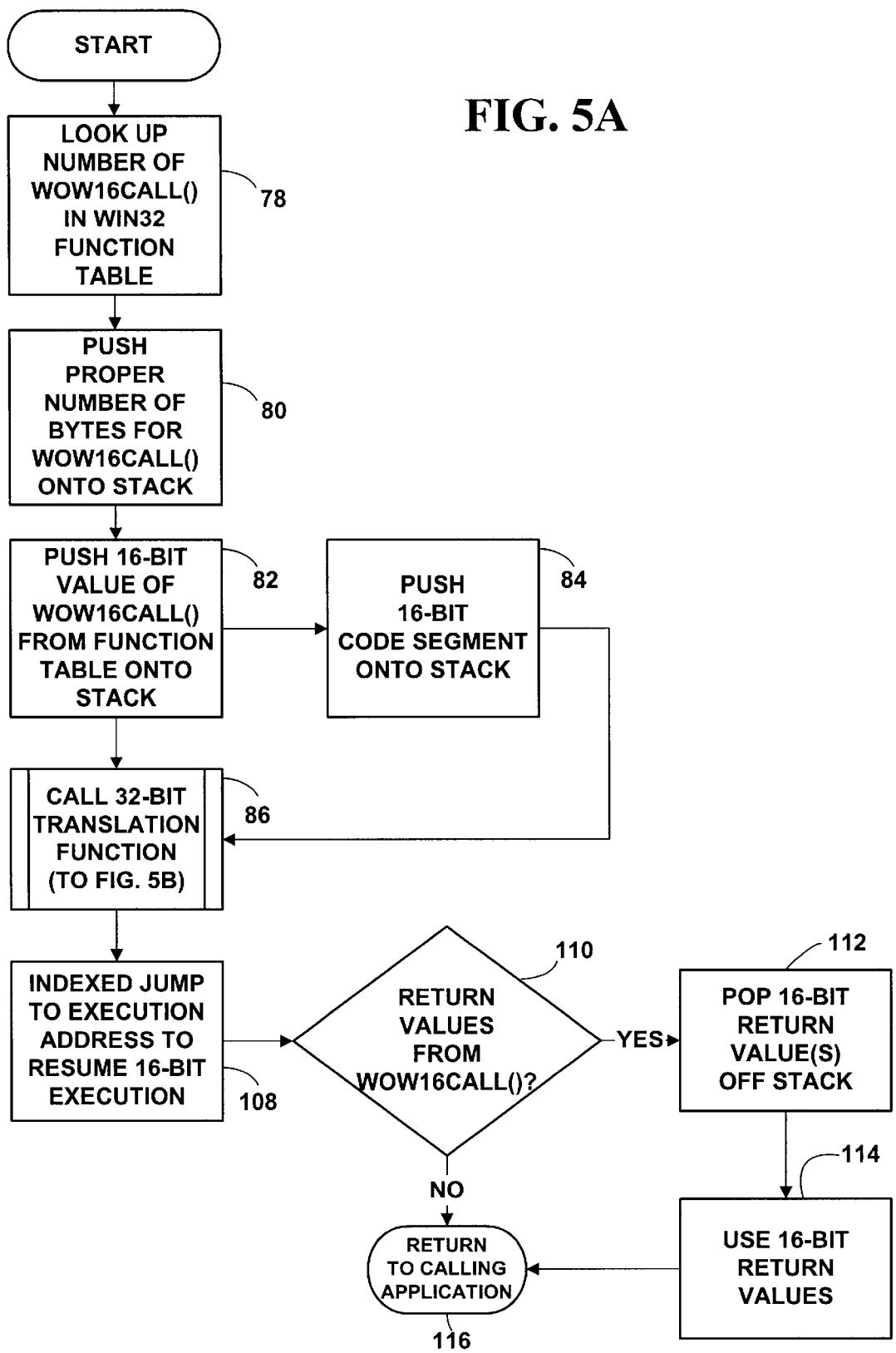
FIG. 5A is a flow chart for thunking a 16-bit function call.
Figure 5B:
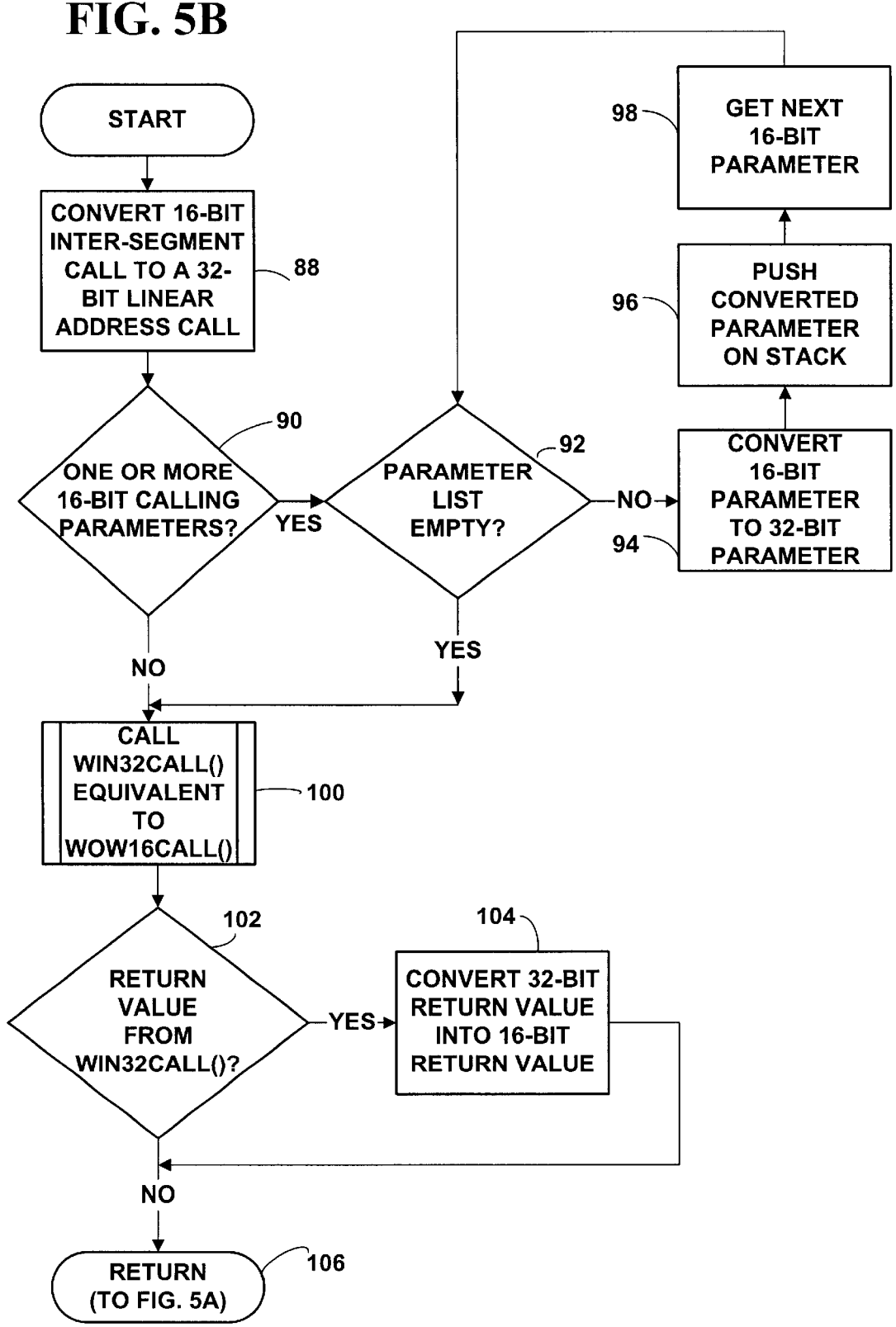
FIG. 5B is a flow chart for translating a 16-bit function call into an equivalent 32-bit function call.
Figure 6:
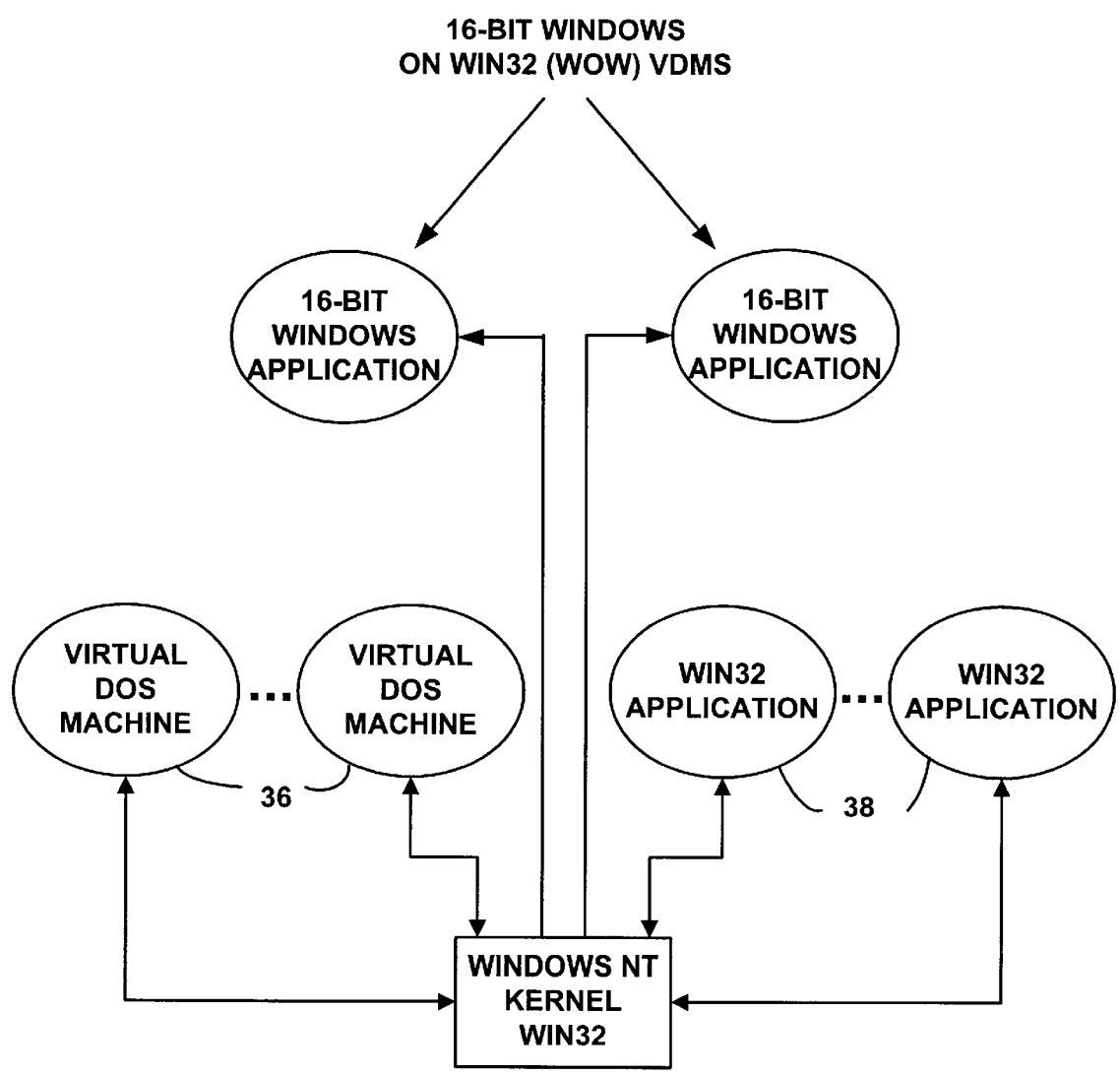
FIG. 6 is a block diagram of a preferred software architecture.

Referring to FIG. 5A, under a WOW VDM, the function call is looked up in the function table 78 then Win32 code pushes the proper number of bytes (e.g. 5 bytes for most Win16 function calls) required for the WOW16Call( ) function call onto the program stack 80. It then pushes the value the 16-bit ordinal value of the function from the function table (e.g. 0×88 for GetDriveType( )) onto the stack 82, and finally pushes the 16-bit code segment register currently in use onto the stack 84. A Win32 function is then called 86 (FIG. 5B), which makes a 16-bit inter-segment call to a 32-bit linear address call 88 within a Win32.DLL. This is shown in FIG. 5B. This linear address is then stored at a fixed location within the Win16 kernel. The function within the Win32.DLL then translates the calling parameters (as needed) 90–98 to 32 bits, and then calls the appropriate Win32 function Win32Call( ) 106 (e.g. GetDriveType( )) to perform the required function. The return value(s) 102 are then de-thunked 104 (i.e. converted back to 16-bit values) and passed back to the WOW16Call( ) 106.

Referring back to FIG. 5A, the WOW16Call( ) uses an indexed jump 108 to return to an execution point and pops the necessary values, including a return value(s) 110–114 off the program stack. The return value(s) from the Win32function call can then be used (i.e. as 16-bit values) by the calling 16-bit application 116.

The Win32.DLL and any other associated Win32 DLLs are mapped to the WOW VDM process space in much the same way that these DLLs would be mapped to any other Win32 process. Some Win16 calls do not have corresponding Win32 functions; most notably, the Win16 memory management. It does not make sense to thunk some Win16 functions into Win32 functions when Win32 does not provide, or have the equivalent, Win16 functionality. Accordingly, a Win16 application call to a limited number of Win16 functions does not result in thunking, but results in a direct call to a corresponding Win16 function.

Some of the Win16 functions intercepted and served by the Win16 kernel have counterparts in the Win32 kernel. These are functions that include few parameters and can more optimally be handled by servicing within the VDM, rather than translating the calls and parameters back and forth between 16-bit and 32-bit formats, with the associated overhead. PeekMessage( ), which checks a message queue, is an example of such a function.

To provide 16-bit code for this function, the corresponding 32-bit function code from Win32 is compiled using a 32-bit compiler. The resulting 32-bit assembly language output is then "transformed", (i.e. converted), to fit into a 16-bit code segment. The transformed function provides the same 32-bit functionality as the equivalent non-transformed 32-bit function. The result of transforming is a function which is fast, takes advantage of enhanced 32-bit functionality, yet fits within the 16-bit memory management scheme. It is therefore not necessary to thunk a transformed function since it is resident in the VDM.

Reference has been made to "thunking," a process familiar to those skilled in the art. See, for example, Oney, Walter, "Mix 16-bit and 32-bit Code in Applications with the Win32s Universal Thunk," Microsoft Systems Journal, v8, n11, p39(16), November, 1993; Finnegan, James, "Test Drive Win32 from 16-bit Code Using the Windows NT WOW Layer and Generic Thunk," Microsoft Systems Journal, v9, n6, p13(22), June, 1994; and Penrod, Paul, "How Today's Apps Will Run Tomorrow: 16 into 32?," Windows Sources, v3, n1, p138(4), January, 1995. See also copending United States Patent Application of Thompson, J., et. al., "Method and System for Providing a Set of Routines That May be Invoked by Programs of Two or More Types," application Ser. No. 08/338,646, filed on Nov. 11, 1994, incorporated herein by reference.

Having illustrated and described the principles of the present invention in a preferred embodiment, it should be apparent to those skilled in the art that the embodiment can be modified in arrangement and detail without departing from such principles. Accordingly, I claim as my invention all such embodiments as come within the scope and spirit of the following claims and equivalents therto.

We claim:

1. In a computer system running an M-bit preemptive multi-tasking operating system, a method for running multiple N-bit applications designed to execute in an N-bit cooperative multi-tasking operating system environment, where N is less than M, the method comprising:

creating a separate virtual machine that emulates the N-bit cooperative multi-tasking operating system environment for each such N-bit application designed to execute in an N-bit cooperative multi-tasking operating system environment; and running each such separate virtual machine within a separate M-bit preemptive multi-tasking process.

2. The method of claim 1, wherein a user may indicate in a graphical user interface whether a next requested N-bit application program shall execute in a virtual machine shared with another existing N-bit application program or shall execute in a separate virtual machine.

3. The method of claim 1, further comprising:

providing in a sublayer of the M-bit operating system a shared M-bit application program services library; and providing N-bit to M-bit application program services stubs, each N-bit to M-bit application program services stub communicating application program service requests and returns between said N-bit applications and the shared M-bit application program services library.

4. The method of claim 3, wherein the shared M-bit application program services library is a library of graphics device interface functions, wherein use of said shared library facilitates simultaneous display of data from a plurality of applications.

5. The method of claim 3 in which the shared M-bit application program services library is a library of functions supporting object linking and embedding between applications, wherein use of said shared library facilitates object linking and embedding between pairs of applications, at least one of which is an N-bit application.

6. The method of claim 3 in which the shared M-bit application program services library is a library of user interface functions.

7. The method of claim 3 which includes, for each of plural of said virtual machines:

loading, onto a stack, data relating to a service requested by an N-bit application program;

invoking an operating system service to identify an M-bit counterpart of said requested service by reference to the data loaded onto the stack; and performing the identified M-bit counterpart service.

8. The method of claim 3 which further includes providing in each virtual machine running an N-bit application, a limited library of N-bit operating system services that can be invoked independently of the shared M-bit application program services library.

9. The method of claim 8 wherein each of the services in said limited library of N-bit operating system services has a counterpart service in the shared M-bit application program services library, and wherein requests by an N-bit application program for any of these services in said limited library is trapped by the handler corresponding thereto and is not communicated to the shared M-bit application program services library.

10. The method of claim 8 which includes compiling M-bit code for each of the services in said limited library of services, providing an assembly language output, and transforming the assembly language output to obtain N-bit code corresponding thereto.

11. In a computer system that includes a processor, an M-bit preemptive multi-tasking operating system, and a memory device coupled to the processor and accessible by said operating system, the system further including a plurality of N-bit applications designed to execute in an N-bit cooperative multi-tasking environment and running in virtual machines executing in the M-bit preemptive multi-tasking operating system, where N is less than M, an improvement comprising presenting simultaneous graphical representations for the plurality of N-bit applications by use of a single operating system graphics engine, as opposed to use of a plurality of cooperating graphics engines wherein each of the plurality of N-bit applications designed to execute in a cooperative multi-tasking environment are executing in a separate virtual machine executing in the M-bit preemptive multitasking operating system.

12. A computer system including at least one processor and an M-bit preemptive operating system, the M-bit operating system providing a set of M-bit functions to perform program service requests, the system further including a virtual machine for running an N-bit application program where N is less than M, certain service requests from the N-bit application being fulfilled by translating the requests to the M-bit operating system and executing counterpart M-bit functions, characterized by the method of:

identifying a predetermined M-bit function;

compiling the function;

converting the function to fit into an N-bit code segment;

providing the converted function in the virtual machine; and responding to service requests by the N-bit application for said predetermined function by executing the N-bit converted function in the virtual machine, rather than by execution of the M-bit function;

wherein execution of said predetermined function for the N-bit application is speeded by avoiding translation of the request to the M-bit operating system, while still providing the full functionality of the M-bit function.

13. A computer storage medium having stored thereon computer executable instructions for performing a method for executing multiple N-bit applications designed to execute in an N-bit cooperative multi-tasking operating system environment in an M-bit preemptive multi-tasking operating system, where N is less than M, the method comprising:

creating a separate virtual machine that emulates the N-bit cooperative multi-tasking operating system environment for each such N-bit application designed to execute in an N-bit cooperative multi-tasking operating system environment; and running each such separate virtual machine within a separate M-bit preemptive multi-tasking process.

14. The computer storage medium of claim 13, wherein the method further comprises:

creating a graphical user interface where a user may indicate whether a next requested N-bit application program shall execute in a virtual machine shared with another existing N-bit application program or shall execute in a separate virtual machine.

15. The computer storage medium of claim 13, wherein the method further comprises:

providing in a sublayer of the M-bit operating system a shared M-bit application program services library; and providing N-bit to M-bit application program services stubs, each N-bit to M-bit application program services stub communicating application program service requests and returns between said N-bit applications and the shared M-bit application program services library.

16. The computer storage medium of claim 15, wherein the shared M-bit application program services library is a library of graphics device interface functions, wherein use of said shared library facilitates simultaneous display of data from a plurality of applications.

* * * * *